United States Patent [19]

Houda et al.

[11] Patent Number: 5,109,517

[45] Date of Patent: Apr. 28, 1992

[54] SYSTEM FOR SELECTIVELY CONTROLLING SLOTS IN AN IBM-AT/NEC 9801 DUAL-COMPATIBLE COMPUTER

[75] Inventors: Pavel Houda, Laguna Hills, Calif.; Yip-Shing Lau, Kowloon, Hong Kong

[73] Assignee: AST Research, Inc., Irvine, Calif.

[21] Appl. No.: 594,835

[22] Filed: Oct. 9, 1990

[51] Int. Cl.⁵ .......................... G06F 3/00; G06F 13/40
[52] U.S. Cl. ............................ 395/800; 364/DIG. 1; 364/221.0; 364/221.1; 364/231; 364/240
[58] Field of Search ... 364/200 MS File, 900 MS File

[56] References Cited

U.S. PATENT DOCUMENTS

| | | | |
|---|---|---|---|
| 4,453,211 | 6/1984 | Askinazi et al. | 364/200 |
| 4,485,439 | 11/1984 | Rothstein | 364/200 |
| 4,716,542 | 12/1987 | Peltz et al. | 364/900 |
| 4,885,482 | 12/1989 | Sharp et al. | 364/200 |
| 4,905,166 | 3/1990 | Scheurman | 364/518 |
| 4,984,213 | 1/1991 | Abdeo et al. | 365/230.3 |
| 4,991,085 | 2/1991 | Pleva et al. | 364/200 |
| 5,036,841 | 7/1991 | Lunsford et al. | 364/708 |

Primary Examiner—Thomas C. Lee
Assistant Examiner—William M. Treat
Attorney, Agent, or Firm—Knobbe, Martens, Olson & Bear

[57] ABSTRACT

A system for selectively controlling individual expansion slots in an IBM-AT/NEC 9801 dual compatible computer provides automatic control for the individual ISA bus expansion slots in the computer. This facilitates the use of an Industry Standard Architecture (ISA) bus and ISA (AT) type add-on cards in the dual compatible computer. A user configures each slot as containing either a card which may interfere with operations of the computer in the non-IBM-AT compatible mode or a card which will not interfere with computer operations in the non-IBM-AT compatible mode. Thereafter, the computer automatically disables the cards in accordance with the mode of computer operation.

9 Claims, 6 Drawing Sheets

SYSTEM FOR SELECTIVELY CONTROLLING SLOTS IN AN IBM-AT/NEC 9801 DUAL-COMPATIBLE COMPUTER

BACKGROUND OF THE INVENTION

1. Field of the Invention

The present invention relates to improvements in NEC 9801/IBM-AT double compatibility computers using a modified Industry Standard Architecture (ISA) compatible bus. The invention involves a method and apparatus for disabling certain individual slots on an ISA compatible bus when the double compatible computer operates in the NEC 9801 compatible mode.

2. Description of the Related Art

The ISA bus is one of the most common standards for desk top computers in the United States. Such desk top computers are often referred to as IBM-AT compatible computers. The ISA bus provides communications between an Intel 80×86 microprocessor and a plurality of add-on cards that provide a plurality of functions (e.g., hard disk controllers, floppy disk controllers, modems, video display controllers, etc.). A number of manufacturers design and sell cards that are compatible with the ISA bus and that can be inserted into so-called expansion slots on the ISA bus.

The Intel 80×86 microprocessors are also used in computers in Japan. For example, the NEC 9801 computer utilizes such microprocessors. Many compatibilities exist between the IBM AT compatible computer standard and the NEC 9801 computer. These compatibilities make it possible to develop a double-compatible computer. However, numerous incompatibilities exist particularly involving Input/Output (I/O), I/O busses and peripheral devices. Some hardware incompatibilities can be solved by using hardware which is mode selectable. However, in many cases, this requires redundant hardware, each set operating in one mode or the other. This is impractical and undesirable. Therefore, complete hardware compatibility is not practical, and thus, one basic hardware bus should be chosen.

If the ISA (AT) bus is chosen for the dual-compatible computer, then only ISA type add-on cards are mechanically and electronically compatible. NEC 9801 add-on cards will not function with the ISA bus. Many ISA compatible add-on cards function properly in the IBM-AT compatible mode and do not interfere with operation of the computer in the 9801 compatible mode (hereinafter referred to as non-interfering cards). However, some ISA cards (hereinafter referred to as interfering cards) which function properly in the IBM compatible mode will interfere with computer operations when the computer operates in the 9801 mode because conflicts exist between devices on the cards and the standard peripheral devices required by the NEC 9801 compatible system. Thus, bus collisions will occur when an interfering ISA card responds to an address which conflicts with the standard peripheral actually requested in the NEC 9801 emulation mode. This can result in a computer misfunction.

These incompatibilities could be solved by designing intelligent add-on cards which do not respond if address conflicts exist and collisions will occur on the bus in the NEC 9801 compatible mode. However, this would require redesigning all ISA (AT) add-on cards to include circuitry to disable the card when the computer operates in the NEC 9801 and an address conflict exists. Many add-on cards are commercially available and are widely used in the United States. It would be impractical and uneconomical to redesign them all just for use in the dual compatible computer; moreover, users often have substantial investment in hardware and would not wish to replace all existing cards with new intelligent cards in order to use the dual compatible computer.

Another solution is for the user to actually remove interfering cards from the bus when using the computer in the NEC 9801 compatible mode. This is very inconvenient because it would require the user to open the computer and remove or insert cards each time the mode of the computer changes. This also presents a risk of damage to the computer from repeated removal and installation of add-on cards.

Tomcat Company, a Japanese corporation, attempted to solve this problem by simply placing jumpers for each slot within the computer which, when removed, would disable a card plugged into the corresponding ISA bus slot. Although this may be preferable over removing the entire card, the user must still open the computer and physically remove the jumper each time the computer mode changes. This may reduce the risk of damage to the computer, but still involves significant inconvenience. Therefore, this attempt to solve the problem was not feasible.

A reasonable solution to this problem would utilize control to automatically disable a slot containing an interfering card whenever the computer operates in the NEC 9801 compatible mode and enable the slot whenever the computer operates in the AT compatible mode. This would prevent any misfunctions and allow the computer to use standard, unaltered, ISA compatible cards without interferences when the computer operates in the 9801 compatible mode.

Implementing a solution to allow use of existing ISA compatible cards without interferences in the computer would dramatically improve the feasibility of IBM AT/NEC 9801 dual-compatible computers.

SUMMARY OF THE INVENTION

The present invention provides a system which allows use of ISA (AT) compatible add-on cards in the IBM-AT/NEC 9801 dual-compatible computer. The invention utilizes a slot control circuit to automatically disable ISA bus slots which contain interfering cards when the computer operates in the NEC 9801 compatible mode. Slots which contain non-interfering add-on cards remain completely active in both modes of operation.

By controlling the individual ISA slots in such a manner to disable the slots during 9801 mode operation, no hardware changes to or re-designing of ISA compatible cards is necessary for use in the dual-compatibility AT/9801 computer because interfering cards will only function in the IBM-AT mode. This means that standard ISA compatible cards can be used in the dual-compatible computer, and the user need not purchase new add-on cards.

One aspect of this invention involves a dual mode computer which selectively functions in an IBM-AT compatible mode and a non-IBM-AT compatible mode. The dual mode computer includes an Industry Standard Architecture (ISA) bus with a plurality of slots for receiving circuit boards therein. The ISA bus includes a control bus comprising standard memory and I/O read and write signals and address lines which recombined serve as chip select signals to control the operation of circuit boards installed in the said slots of the ISA bus. The computer includes an additional mode indication signal which indicates whether the computer is operating in the IBM-AT compatible mode or the non-IBM-AT compatible mode.

The computer includes at least one AT-only circuit board connected to the ISA bus which functions properly in response to signals on the ISA bus when the computer is operating in the IBM-AT compatible mode and which functions improperly and interferes with the operation of the computer if enabled when the computer is operating in the non-IBM-AT compatible mode.

The computer uses a plurality of switches to configure each of the slots, each switch providing a respective slot configuration signal indicating whether the AT-only circuit board is connected in that slot. The computer also utilizes slot control logic responsive to the mode indication signal and to the slot configuration signal to automatically enable or disable a slot so that the AT-only circuit board is enabled only when the computer is operating in the IBM-AT compatible mode.

The computer implements the control through slot control logic that can enable or disable a slot by allowing or preventing propagation of the standard memory and I/O read and write and other control signals, ordinarily active to each slot on the control bus.

The plurality of switches described comprise a DIP (dual in-line package) switch assigned to each slot and the switches are accessible through an access panel at the front of the computer.

The AT-only circuit cards described can be cards which respond to addresses which conflict with the standard peripherals required by the computer operating in the non-IBM-AT compatible mode.

Another aspect of the invention involves an apparatus that controls a plurality of individual slots on an ISA compatible bus in a dual mode computer that selectively operates in either an IBM-AT compatible mode or a non-IBM-AT compatible mode, wherein the ISA compatible bus comprises a plurality of control signals for the slots. Each of the slots can receive a circuit board of a first compatibility type operative in both modes or a circuit board of a second compatibility type which only functions properly in the IBM-AT mode and which interferes with operation of the computer in the non-IBM-AT mode. The computer also includes a mode signal which indicates whether the computer is operating in the IBM-AT mode or the non-IBM-AT mode.

The apparatus includes a respective configuration switch for each of the slots that generates a respective configuration signal that indicates the compatibility type of a respective circuit board within the slot. A slot control circuit for each of the slots which responds to the mode signal and to the respective configuration signal for the slot to disable a plurality of bus control signal inputs and outputs to and from the circuit board in the slot in accordance with the compatibility type of the circuit board.

The respective configuration switches can comprise DIP switches assigned to a particular slot on the ISA bus.

Another aspect of the present invention involves an apparatus for automatically disabling each individual ISA bus slot in a dual mode computer that selectively operates in either an IBM-AT compatible mode or a non-IBM-AT compatible mode, wherein the dual mode computer has a mode signal indicating its mode of operation. The apparatus includes a configuration signal for each slot that indicates whether the slot contains an ISA compatible circuit board which functions correctly in both modes or contains an ISA compatible circuit board which interferes with the operation of the computer in the non-IBM-AT compatible mode.

The apparatus also includes a slot controller for each slot responsive to the mode signal and the respective configuration signal to provide a slot control signal. A gate for each slot responsive to the respective slot control signal selectively enables or disables propagation of a plurality of control signals to and from the ISA compatible circuit board installed in the corresponding slot.

DETAILED DESCRIPTION OF THE PREFERRED EMBODIMENT

Figure 1:
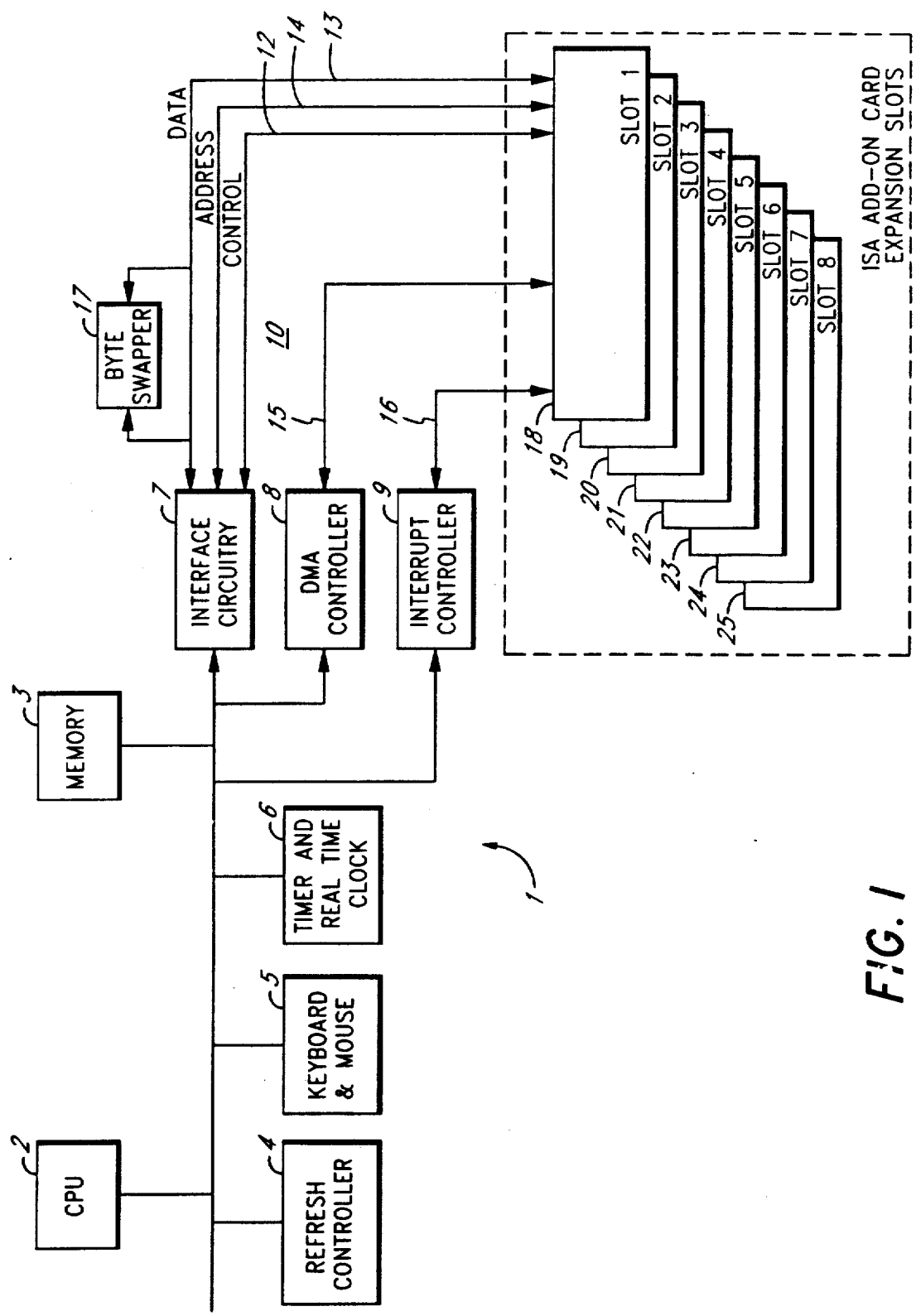
FIG. 1 illustrates an ISA compatible bus and supporting resources in block diagram form without the inclusion of any slot control.

FIG. 1 illustrates a simplified block diagram of an exemplary IBM-AT compatible computer system 1 that incorporates an ISA compatible bus 10. Such a computer system 1 is well understood in the art. For more detailed information on the structure and operation of the ISA bus see, for example, Solari, *AT Bus Desion*, Annabooks, 1990. As illustrated in the block diagram in FIG. 1, the computer system 1 includes, for example, a microprocessor (CPU) 2, a memory 3, a refresh controller 4, a keyboard 5, a timer and real time clock 6, interface circuitry 7, a DMA controller 8, an interrupt controller 9, and a byte swapper 17.

An ISA bus 10 includes control lines 12, data lines 13, address lines 14, DMA lines 15, and interrupt lines 16 which interconnect the interface circuitry 7, the DMA controller 8 and the interrupt controller 9 to a plurality of expansion slots 18-25 to provide communications between add-on cards (not shown) in the expansion slots and the other microprocessor 2 and the memory 3. As illustrated, the expansion slots on the exemplary ISA bus include first through eighth slots 18-25.

Figure 2:
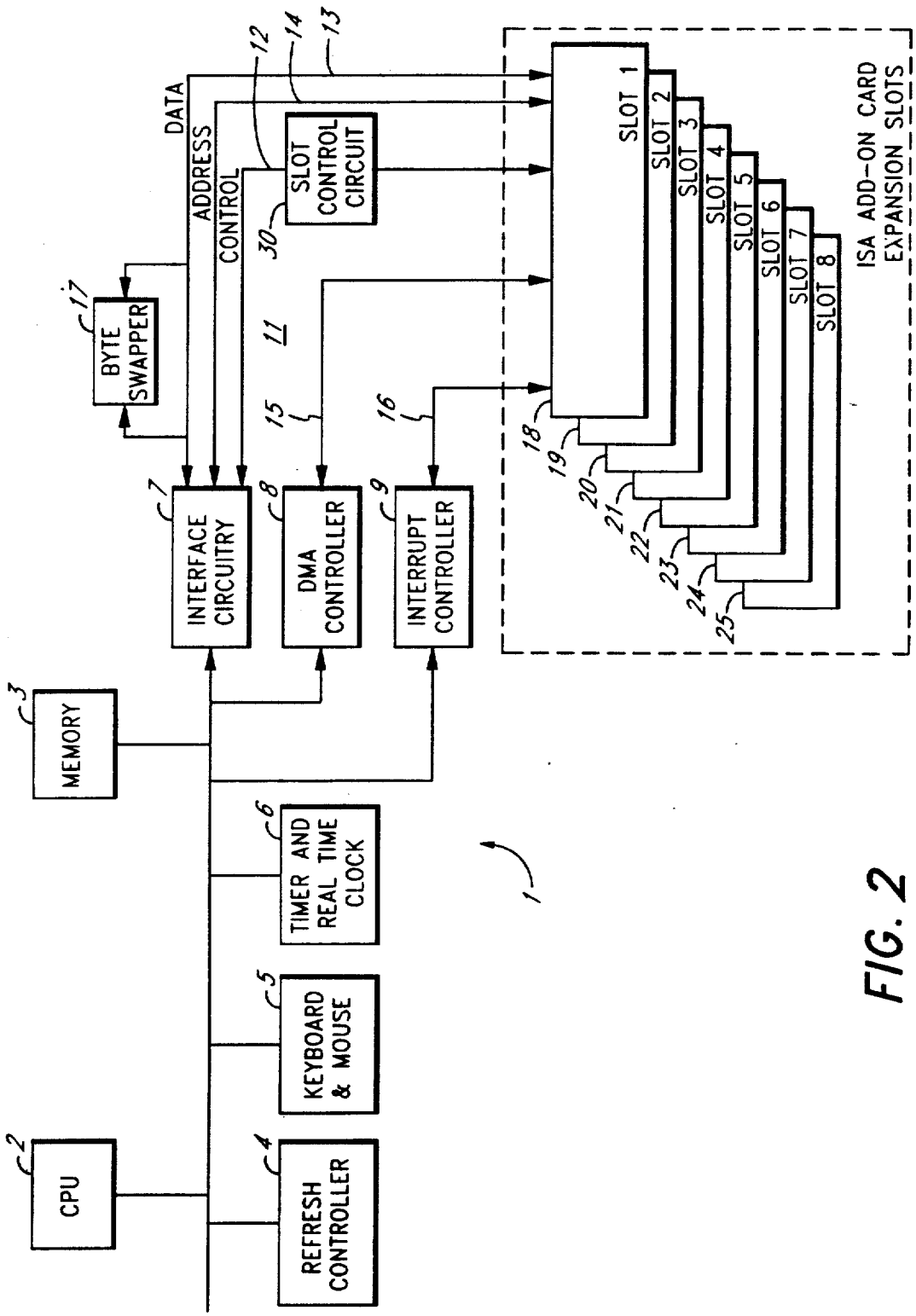
FIG. 2 illustrates a modified ISA compatible bus block diagram that includes the slot control circuit of the present invention which manipulates the control signals of the ISA control bus to provide individualized slot control.

FIG. 2 illustrates a modified ISA bus 11 for use in a dual mode computer system which can operate in the IBM-AT compatible mode or in a mode compatible with the NEC 9801. Thus, the dual-mode computer system can run programs developed specifically for the NEC 9801 computer in Japan and also run programs developed for IBM-AT compatible computers. The modified ISA bus 11 includes a mode signal among the control lines 12 which indicates the mode of computer operation—NEC 9801 or IBM-AT compatible mode. Such a modified ISA bus 11 and a computer system chip set are available from Tomcat Computer Company, a Japanese corporation. The mode signal is controlled by configuration logic included within the system chip set so that the system can configure itself according to the operational mode of the computer system.

FIG. 2 further illustrates, in block diagram form, the inclusion of a slot control circuit 30 of the present invention that is not available as part of the commercially available modified ISA bus. The control block 30 includes the control logic necessary for controlling propagation of various control lines 12 to and from add-on cards installed in the ISA expansion slots 18-25 so that the add-on cards will be selectively enabled and disabled in accordance with the mode of operation of the computer system.

Figure 3:
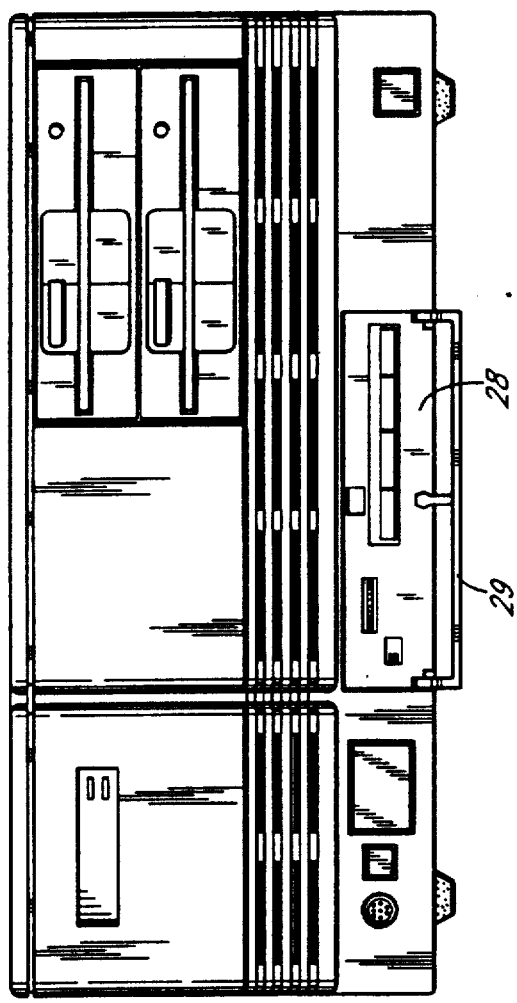
FIG. 3 illustrates a face of a dual-compatible computer with the front access panel open.
Figure 4:
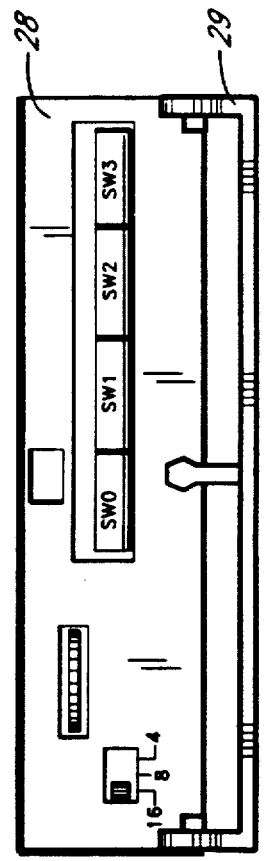
FIG. 4 illustrates the open access panel on a dual-compatible computer.

FIG. 3 illustrates an embodiment of the front panel of the dual compatible computer that includes the present invention. The front panel 32 has an access panel 28 shown expanded in FIG. 4. The access panel 28 is shown with the panel door 29 open for access to various controls and switch banks SW0, SW1, SW2 and SW3. Switch banks similar to SW0, SW1, SW2 and SW3 are included as part of a conventional system available from Tomcat Computer Co. and control the operations of the computer system in a known manner. The switch banks SW1, SW2 and SW3 are included to provide control of the operation of the computer system in the NEC 9801 compatible mode and correspond to switch banks included as part of a conventional NEC 9801 computer. The switch bank corresponding to SW0 was a 4-switch DIP (dual in-line package) added by to the Tomcat Corporation to control the computer designed by Tomcat. In the present invention, this switch bank SW0 is expanded to a 10-switch DIP. As discussed below, six of the switches in the switch bank SW0 and one previously unused switch in the switch bank SW3 are used in the present invention to control the operation of the slot control circuit 30.

Figure 8:
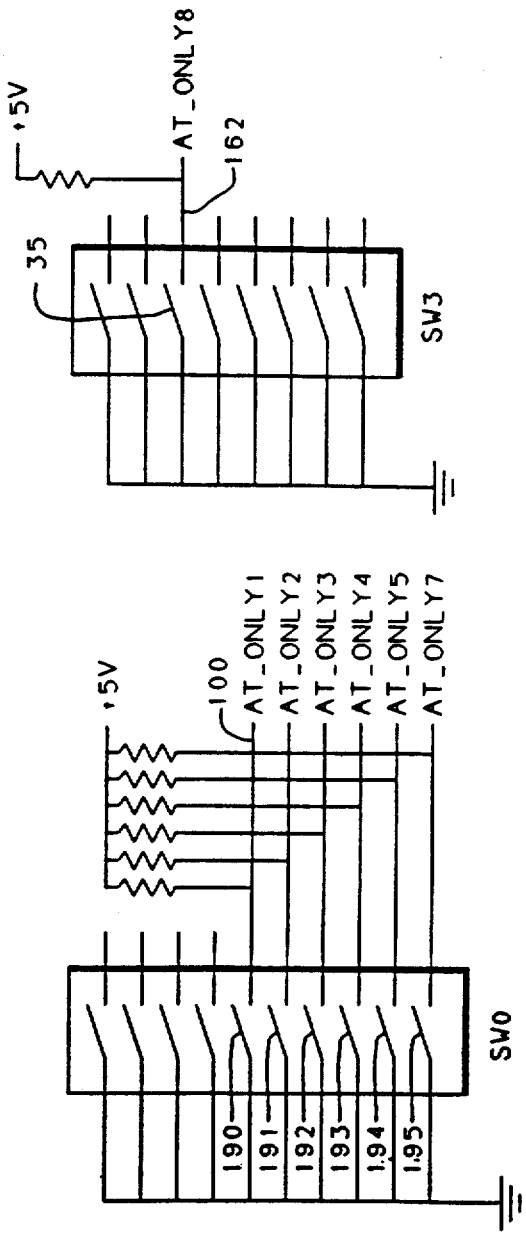
FIG. 8 illustrates a schematic diagram of the dip switches used to configure each slot as containing a non-interfering or interfering card.

The user may access the switch banks SW0, SW1, SW2 and SW3 through the panel 28 by opening the door 29. The switch banks SW0 and SW3 are shown schematically in FIG. 8. Four of the switches of the switch bank SW0 are used to control other functions previously designed by Tomcat. The connections to these four switches are not shown. The switch bank SW3 is an 8-switch DIP. As discussed above, only one switch in the switch bank SW3 is used in the present invention.

According to the present invention, the user must utilize switches in the switch banks SW0 and SW3 to configure each of the first through fifth, seventh and eighth expansion slots 18-22, 24 and 25 to reflect whether the expansion slot contains a non-interfering card which may remain completely enabled in both modes or as containing an interfering card which would present conflicts when the computer operates in the NEC 9801 mode. The sixth expansion slot 23 does not need this configuration capability in the preferred embodiment, as the sixth slot 23 is dedicated to a video display adapter piggy-back card which provides a video card for both modes of operation and this video display adapter uses a bus signal itself to selectively disable the improper card according to the computer mode.

In the present embodiment, the eighth slot 27 is configured with a switch 35 from the switch bank SW3. The first through fifth and seventh expansion slots 18-22, 24 are configured with six switches 190-195 in the switch bank SW0.

To configure the slots, the user must properly set the corresponding DIP switch in the switch banks SW0 and SW3 to properly configure the corresponding slot whenever the user installs or removes cards from the ISA compatible bus. A switch set to a high level, or to the 'ON' position, configures the corresponding slot for a card which will interfere with computer functions in the NEC 9801 compatible mode. Conversely a switch set to a low level, or to the 'OFF' position, configures the corresponding slot for a card which will not interfere with computer functions in the NEC 9801 compatible mode.

Once each of the expansion slots 18-22, 24, 25 is configured properly, control for the slot is automatic as described further herein.

Figure 5:
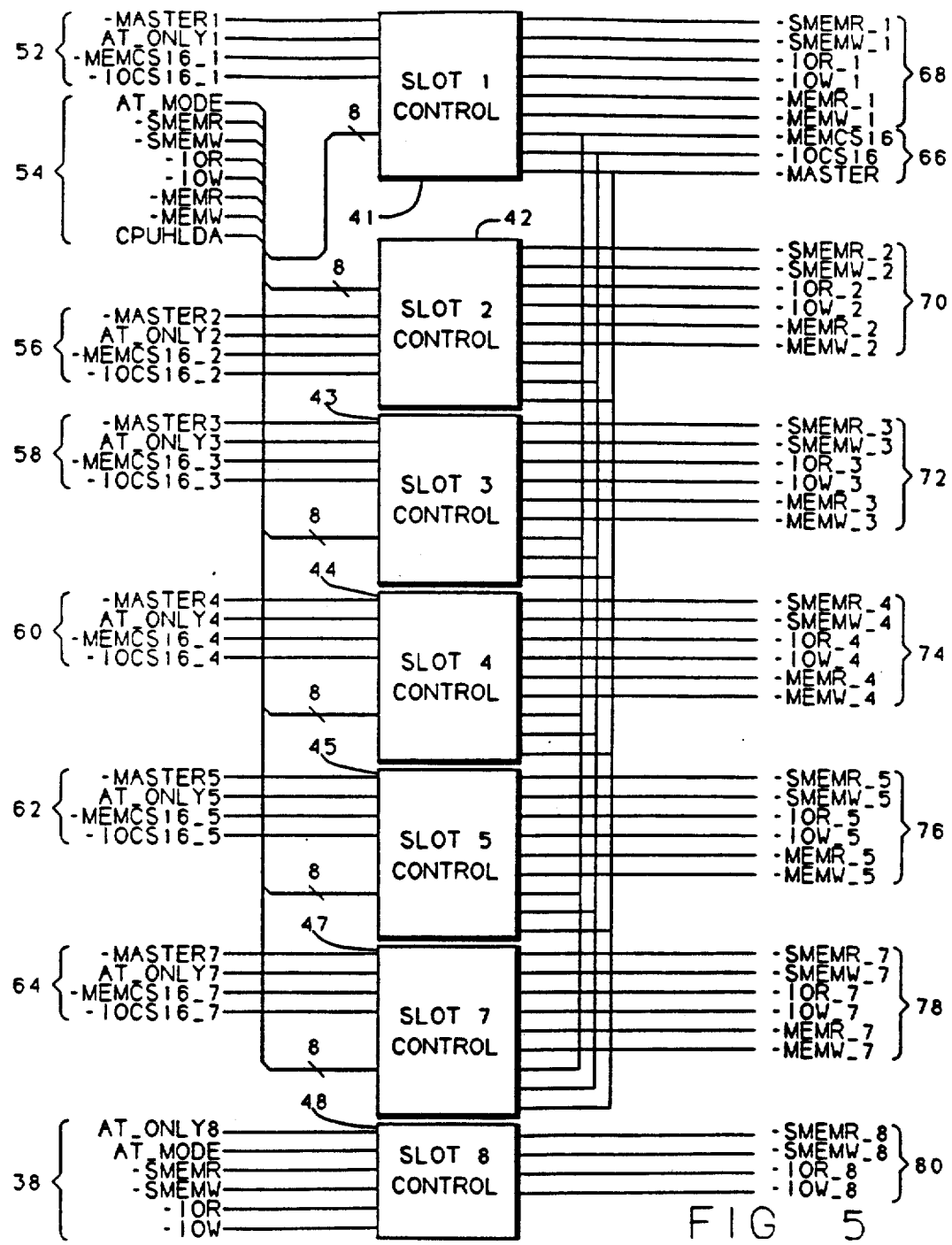
FIG. 5 illustrates a block diagram of the slot control circuit for slots 1-5 and 7-8, including the control signal inputs and outputs for each block.

FIG. 5 illustrates a block diagram of slot control circuits for the first through fifth, seventh and eighth expansion slots 18-22, 24, 25. A slot 1 control circuit 41 selectively enables and disables control signals to and from the first expansion slot 18. A slot 2 control circuit 42, a slot 3 control circuit 43, a slot 4 control circuit 44, a slot 5 control circuit 45, a slot 7 control circuit 47 and a slot 8 control circuit 48 selectively enable and disable control signals to and from the second through fifth, seventh and eighth expansion slots 19-22, 24, and 25, respectively. As illustrated in FIG. 5, each slot control circuit 40-51 is connected to a plurality of input signal lines 52-64 and a plurality of output signal lines 66-80. The slot control circuits 41-45, 47 for the first through fifth and seventh expansion slots each use eight common input signal lines 54 and four slot control specific signal lines 52, 56-64. The slot control circuits 41-45, 47 have six slot specific outputs 68-78 and 3 common outputs 66. The slot 8 control circuit 48 differs from the other slot control circuits in that it has six inputs 38, and has four outputs 80.

For clarity and simplicity in discussion, the signals for the slot control circuits 41-45, 47 will be discussed in connection with the slot 1 control circuit 41 only since the slot control circuits 41-45, 47 are substantially identical and operate in the same manner. The slot 8 control circuit 48 will be discussed separately below.

Figure 6:
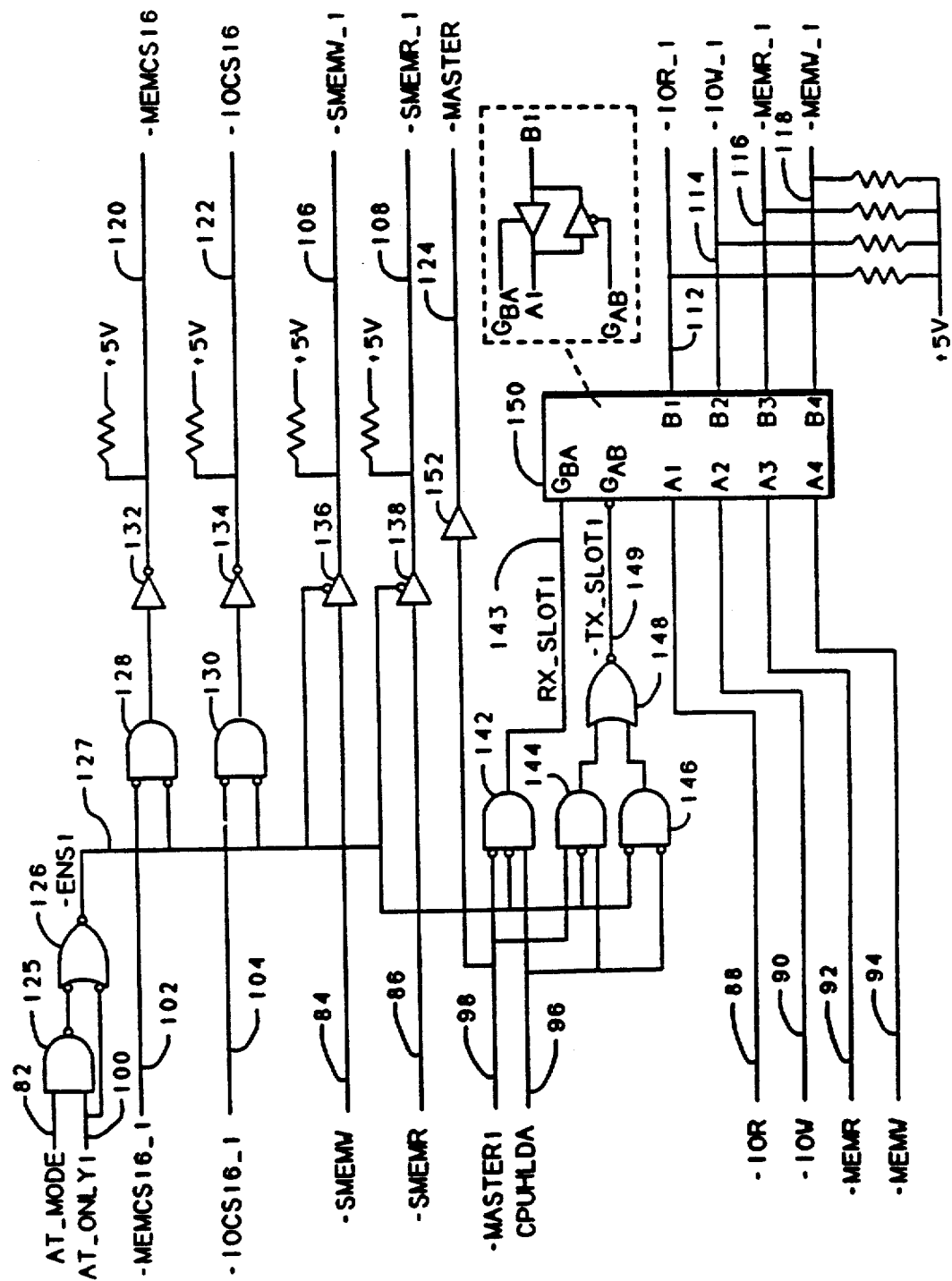
FIG. 6 is a schematic diagram of the slot 1 control circuit logic. This same logic is repeated in each of the slot control circuit 1-5 and 7 in FIG. 1.

FIG. 6 depicts the control logic that implements the slot 1 control circuit 41 of FIG. 5. As discussed above, the control logic in the slot control circuit 41 is repeated for each of the slot control circuits 41-45, 47.

The eight common signal lines 54 of FIG. 5 are depicted individually in FIG. 6. Although the slot control circuitry described herein is illustrated using discrete logic, in another embodiment the circuitry may be implemented using a programmable logic array as is well understood in the art. A hyphen or minus sign "−" in front of signal line indicates that it is conventionally an active low signal line.

An AT_MODE signal line 82 carries the signal provided on the modified ISA bus 11 and elsewhere within the design to indicate the computer's mode of operation. A logic high on this line indicates operation in the AT compatible mode and a low indicates operation in the NEC 9801 compatible mode. An −SMEMW signal line 84 and an −SMEMR signal line 86 are standard ISA bus memory and read write signals lines, respectively, for reading and writing to addresses within the first one megabyte of address space as is well understood in the art. An −IOR signal line 88 and an −IOW signal line 90 are standard ISA bus input/output read and write signal lines well understood in the art. An −MEMR signal line 92 and an −MEMW signal line 94 are standard ISA bus memory read and write control signal lines for memory address space beyond the first megabyte of address space. A CPUHLDA signal line 96 is the INTEL 80x8x CPU hold acknowledge signal line well understood in the art.

In the group of slot specific input signal lines 52, a −MASTER1 signal line 98 is the standard ISA bus signal line which allows an alternate processor installed in the first expansion slot 18 to control the bus lines as is well understood in the art. The −MASTER1 signal line 98 is activated by a card in the first expansion slot 18 when it has been granted control of the ISA bus.

The AT_ONLY1 line 100 provides a slot 1 configuration signal from the DIP switch 37 (FIG. 8) corresponding to configurable bus slot 1. AT_ONLY1 is active at a logic high when the first expansion slot 18 is configured as containing an interfering add-on card. The DIP switch 37 is set to a logic low if the first expansion slot 18 contains a non-interfering card.

An −MEMCS16_1 signal line 102 and an −IOCS16_1 signal line 104 are standard memory and I/O control lines from the first expansion slot 18 to indicate that the card transfers 16 data bits (i.e., two bytes) at a time instead of 8 data bits (one byte) as well known in the art. These signal lines are activated by an add-on card in the first expansion slot 18 when it has been granted access to the ISA bus.

The six individualized outputs, an −SMEMW_1 signal line 108, an −SMEMW_1 signal line 106, an −IOR_1 signal line 112, an −IOW_1 signal line 114, an −MEMR_1 signal line 116, and an −MEMW_1 signal line 118 have signals that correspond to the signals on the conventional ISA bus signal lines −SMEMR 86, −SMEMW 84, −IOR 88, −IOW 90, −MEMR 92, and −MEMW 94 described above. However, the signals on the output lines are gated within the slot 1 control circuit 41 so that the signals can be selectively disabled to preclude the operation of a card within the first expansion slot 18.

The three common output lines are activated as needed by an add-on card within an expansion slot that has been granted access to the ISA bus. An −MEMCS16 signal line 120 and an −IOCS16 signal line 122 indicate that a card responding or using the bus utilizes 16 data bits instead of 8 as is well understood in the art. The common −MASTER line 124 is used by an alternate processor to control the bus as is well understood in the art.

According to the present invention, if the first expansion slot 18 is configured as containing an interfering add-on card, the memory read/write, I/O read/write and I/O and chip select ISA bus control signal lines 84, 86-94 must be disabled in the 9801 mode (i.e. the AT_MODE signal line is low) to prevent an add-on card in the first expansion slot 18 from responding to a read or write signal or from driving the I/O read/write and memory read/write bus control signal lines 112-118 if the card is a bus owner.

By preventing propagation of these signals to or from the first expansion slot 18, the add-on card therein will not interfere with bus operations when the computer is running in the NEC 9801 compatible mode.

The AT_ONLY1 signal line 98 and AT_MODE signal line 80 are combined in an NAND-gate 125 and a NOR-gate 126 to generate a control signal on the -ENSI signal line 127. The −ENSI line 127 carries the main control signal for the slot 1 control circuit 41 which enables or disables propagation of signals on the memory read/write, I/O read/write and I/O and chip select control lines 84-94, 102-104 to the first expansion slot 18 and the memory and I/O read/write control lines 112-118 from the first expansion slot 18. The −ENSI signal line 127 is driven low when the first expansion slot 18 should be enabled. This condition occurs when either AT_ONLY1 signal line 100 is low—indicating that the card is completely compatible in both modes—or when AT_ONLY1 100 is high, but AT_MODE 82 is also high indicating that the computer is operating in the AT compatible mode. In either of these conditions, slot 1 can remain active without causing a misfunction.

If the AT_MODE signal line 82 is low, indicating that the computer is operating in the 9801 compatible mode, and the AT_ONLY1 signal line 100 is high, indicating that the first expansion slot 18 contains an interfering card, then the −ENSI signal line 127 will be driven high to disable the signal lines as described below.

As illustrated, a pair of AND-gates 128, 130 and a pair of inverters 132, 134 respond to the level of the −ENSI signal line 127 and combine to enable or disable propagation of the signals on the −MEMCS16_1 signal line 102 and the −IOCS16_1 signal line 104. A pair of tri-state gates 136, 138 respond to the −ENSI signal to control the propagation of the signals on the −SMEMW signal line 86 and the −SMEMW signal line 84.

The −IOR signal line 88, the −IOW signal line 90, the −MEMR signal line 92, and the −MEMW signal line 94 can operate as inputs to the add-on card in the first expansion slot 18, but can also originate as outputs from the card. Therefore, propagation control of the signals on these signal lines incorporates logic to control the direction of these signals in accordance with whether the add-on card is card that can control or "own" the ISA bus (i.e., a master card) or a card that responds to control from the bus (i.e., a slave card).

A bi-directional transmission gate 150, responsive to the signals on an RX_SLOT1 signal line 143 and a −TX_SLOT1 signal line 149 controls propagation of signals on the −IOR, −IOW, −MEMR, and −MEMW signal lines 88-94 from the control bus 12 to the −IOR_1, −IOW_1, −MEMR_1 and −MEMW_1 signal lines 112-118 connected to the first slot 18 (hereinafter referred to as forward propagation to indicate that the signals are propagating from the control bus 12 to the add-on card), and controls propagation of signals on the −_IOR_1, −IOW_1, −MEMR_1 and −MEMW_1 signal lines 112-118 from an add-on card in the first slot 18 to the −IOR, −IOW, −MEMR, and −MEMW signal lines 88-94 on the control bus 12 (hereinafter referred to as reverse propagation to indicate that the control signals are propagating from the add-on card to the control bus 12). The transmission gate 150 will prevent propagation in either direction if neither the RX_SLOT1 signal line 143 or the −TX_SLOT1 signal line 149 is active (i.e. the −ENSI signal line is high). The bi-directional gate logic to implement the function of the transmission gate 150 for one signal line is shown in an inset.

An AND-gate 142 responsive to signals on the −MASTER1 signal line 98, the −ENSI signal line 127 and the CPUHLDA signal line 96, supplies a signal on the RX_SLOT1 signal line 143.

Two AND-gates 144, 146 responsive to signals on the −MASTER1 signal line 98, the −ENSI signal line 127 and the CPUHLDA signal line 96, combine with an OR-gate 148 to supply a signal on the −TX_SLOT1 signal line 149.

If the −ENSI signal line 127 is not active, then the AND-gate 142 will not drive the RX_SLOT1 signal line 143 active and reverse propagation through the transmission gate 150 will be disabled. Also, if the -ENSI signal line 127 is not active, then neither of the AND-gates 144, 146 will drive the OR-gate 148 which in turn will not drive the −TX_SLOT1 signal line 149 active and forward propagation through the transmission gate 150 will disabled. In sum, if −ENS1 is not active, then all signal propagation through the transmission gate 150 is disabled without regard to signals on the −MASTER1 and CPUHLDA signal lines 98, 96.

If −ENS1 120 is active, then the directional logic consisting of AND-gates 142, 144, 146 and the OR-gate 148 will respond to the signals on the −MASTER1 and the CPUHLDA signal lines 98, 96 to enable the transmission gate 150 to allow propagation in one direction or the other as described below.

If the add-on card in the first expansion slot 18 is the temporary owner of the bus, then the −MASTER 1 signal is active and the CPUHLDA line 96 is also active. If the −ENSI line 127 is also active, then AND-gate 142 will drive the RX_SLOT1 signal line 143 active which will in turn enable reverse propagation through the transmission gate 150.

Either of two conditions will enable forward propagation through the transmission gate 150 if the −ENSI signal line is active. First, if the add-on card in the first expansion slot 18 is not the owner of the bus but some other device (the DMA controller) has control of the bus then the −MASTER1 signal line 98 will be inactive but the CPUHLDA line will be active. Under these conditions the AND-gate 144 will be active and drive the OR-gate 148 to provide and active signal on the −TX_SLOT1 signal line 149. Second, if the CPUHLDA signal line 96 is not active (e.g. the CPU is accessing the bus), then the AND-gate 146 will be active and drive the OR-gate 148 to provide an active signal on the −TX_SLOT1 signal line 149.

Figure 7:
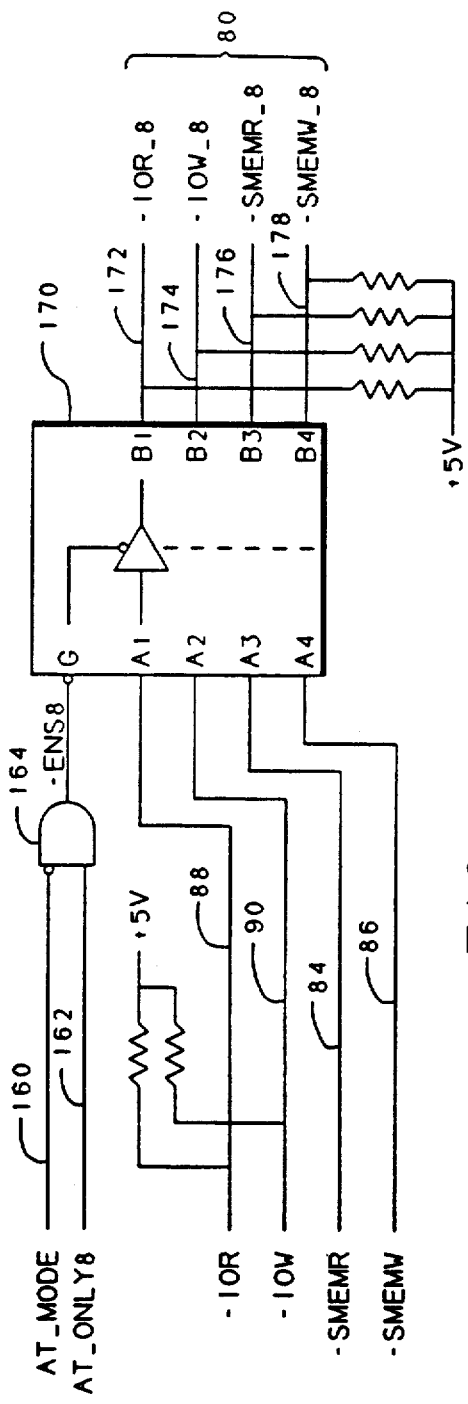
FIG. 7 illustrates a schematic representation of the slot 8 control circuit logic.

FIG. 7 illustrates the slot 8 control circuit 48. This circuit 48 differs from the first through fifth and seventh slot control circuits 41-47 because the −IOR 88, −IOW 90, −SMEMW 84, AND −SMEMW 86 signals are unidirectional—they only act as inputs to the eighth expansion slot 25 in the preferred embodiment. Moreover, the eighth expansion slot 48, according to the preferred embodiment, can only contain an 8 bit card; therefore, an add-on card in slot 8 will not utilize the memory or I/O chip select signals 102, 104 as previously explained for the slot 1 control circuit 41.

To effectuate the slot 8 control circuit 47 an AND-gate 164 responds to signals on the AT_MODE signal line 160 and the AT_ONLY8 signal line 162 to provide a signal on an −ENS8 signal line 164. A multi-line enable gate 170 responds to the signal on the −ENS8 signal line 164 to selectively enable or disable propagation of signals −SMEMR, −SMEMW, −IOR, and the −IOW, signal lines 84, 86, 88, 90 from the control bus 12 to a −SMEMR_8 signal line 176, a −SMEMW_8 signal line 178, a −IOR_8 signal line 172 and a −IOW_8 signal line 174 connected to slot 8. The logic to implement the function of the enable gate 170 for one signal line is shown within the gate 170.

If the card in the eighth expansion slot 25 is configured with switch 35 as containing a non-interfering add-on card, indicated by a low on the AT_ONLY8 signal line 162, or if the eighth expansion slot 25 is configured as containing an interfering card (i.e. the AT_ONLY8 signal line is high) and the computer is operating in the AT compatible mode, indicated by a high on the AT_MODE 160 line, then the AND-gate 164 will respond with a low on the −ENS8 line to enable the gate 170 to allow propagation of signals on the −SMEMR, −SMEMW, −IOR and the −IOW signal lines 86–90.

If however, the card in the eighth expansion slot 25 is configured as containing an interfering card, indicated by a high on the AT_ONLY8 signal line 162, and the computer is operating in the NEC 9801 compatible mode, indicated by a low on the AT_MODE signal line 160, then the AND-gate 164 will respond with a high on the −ENS8 signal line which will disable the gate 170 and prevent propagation of signals on the −SMEMR, −SMEMW, −IOR, and the −IOW signal lines 86–90.

The slot control of the present invention need not be implemented for every slot of the computer, but may be used for any predetermined number of the slots if less versatility is desired.

Other embodiments than described here are obvious to those skilled in the art and do not detract from the subject matter regarded as invention.

We claim:

1. A dual mode computer which selectively functions in an IBM-AT compatible mode and a non-IBM-AT compatible mode, said dual mode computer including an Industry Standard Architecture (ISA) bus having a plurality of slots for receiving circuit boards therein, said ISA bus including a control bus comprising standard memory and I/O read and write signals and other control signals to control the operation of circuit boards in said slots of said ISA bus, said slots further adapted to receive master circuit boards, which can control said ISA bus, said computer including an additional mode indication signal which indicates whether the computer is operating in said IBM-AT compatible mode or said non-IBM-AT compatible mode, comprising:

at least one AT-only circuit board connected to said ISA bus which functions properly in response to signals on said ISA bus when the computer is operating in said IBM-AT compatible mode and which functions improperly and interferes with the operation of the computer if enabled when the computer is operating in said non-IBM-AT compatible mode;

a plurality of switches to configure each of said plurality of slots, each switch providing a respective slot configuration signal indicating whether said AT-only circuit board is connected in that slot; and slot control logic responsive to said mode indication signal and to said slot configuration signal to automatically enable or disable a slot so that said AT-only circuit board is enabled only when the computer is operating in the IBM-At compatible mode, said slot control logic further responsive to a master signal to further select the direction of propagation of said control signals through said slot control logic so that said master circuit board, if installed, can assume control of said ISA bus.

2. The slot control logic of claim 1, wherein the slot control enables or disables a slot by allowing or preventing propagation of the standard memory and I/O read and write and chip select signals, ordinarily active to each slot on the control bus.

3. The plurality of switches of claim 1, wherein each switch comprises a dip switch assigned to each bus slot and wherein each dip switch is within a dip switch block accessible to the front panel of the computer.

4. The AT-only circuit board of claim 1, wherein the board contains addresses and wherein said addresses conflict with the standard peripherals required by the computer operating in the non-IBM-AT compatible mode.

5. An apparatus that controls a plurality of individual slots on an ISA compatible bus in a dual mode computer that selectively operates in either an IBM-AT compatible mode or a non-IBM-AT compatible mode, wherein the ISA compatible bus comprises a plurality of control signals for the slots, wherein each of said slots can receive a circuit board of a first compatibility type operative in both modes or a circuit board of a second compatibility type which only functions properly in the IBM-AT mode and which interferes with operation of the computer in the non-IBM-AT mode, said slots further adapted to receive master circuit boards of said first and second compatibility types which can control said bus, and wherein the computer has a mode signal which indicates whether the computer is operating in said IBM-AT mode or said non-IBM-AT mode, said apparatus comprising:
- a respective configuration switch for each of said slots that generates a respective configuration signal that indicates the compatibility type of a respective circuit board within the slot;
- a slot control circuit for each of said slots, said slot control circuit for a slot responsive to said mode signal and to the respective configuration signal for said slot to disable a plurality of bus control signal inputs and outputs to and from said circuit board in said slot in accordance with the compatibility type of said circuit board, said slot control circuit further responsive to a master signal to select a direction of propagation of said control signals through said slot control circuit appropriate to allow said master circuit board to assume control of said ISA bus.

6. The respective configuration switches of claim 5, wherein each switch comprises a dip switch assigned to a particular slot on the ISA bus.

7. An apparatus for automatically disabling each individual ISA bus slot in a dual mode computer that selectively operates in either an IBM-AT compatible mode or a non-IBM-AT operatively mode, wherein the dual computer has a mode signal indicating its mode of operation, said computer adapted to receive master circuit boards which can control said bus, said apparatus comprising:
- a configuration signal for each slot that indicates whether the slot contains an ISA compatible circuit board which functions correctly in both modes or contains an ISA compatible circuit board which interferes with the operation of the computer in the non-IBM-AT compatible mode;
- a slot controller for each slots responsive to the mode signal and the respective configuration signal to provide a slot control signal, said slot controller further responsive to a master signal to select a direction of propagation of said control signals appropriate to allow said master circuit board to assume control of said bus; and
- a gate for each slot responsive to the respective slot control signal to selectively enable or disable propagation of a plurality of control signals to and from the ISA compatible circuit board installed in each slot.

8. The slot controller of claim 7, wherein the controller comprises a programmable logic array.

9. A dual mode computer which selectively functions in an IBM-AT compatible mode and a non-IBM-AT compatible mode, said dual mode computer including an Industry Standard Architecture (ISA) bus having a plurality of slots for receiving circuit boards therein, wherein said slots adapted to receive master circuit boards which can control said bus, said ISA bus including a control bus comprising standard memory and I/O read and write signals and chip select signals to control the operation of circuit boards in said slots of said ISA bus, said computer including an additional mode indication signal which indicates whether the computer is operating in said IBM-AT compatible mode or said non-IBM-AT compatible mode, comprising:
- at least one single compatible circuit board connected to said ISA bus which functions properly in response to signals on said ISA bus when the computer is operating in said IBM-AT compatible mode and which functions improperly and interferes with the operation of the computer if enabled when the computer is operating in said non-IBM-AT compatible mode;
- at least one dual compatible circuit board connected to said ISA bus which functions properly in response to signals on said ISA bus when the computer is operating in said IBM-AT compatible mode and which does not interfere with the operation of the computer if enabled when the computer is operating in said non-IBM-AT compatible mode;
- a plurality of switches to configure each of said plurality of slots for either a single compatible circuit board or a dual compatible circuit board, each switch providing a respective slot configuration signal indicating whether a single compatible board is connected in that slot; and
- slot control logic responsive to said mode indication signal and to said slot configuration signal to automatically enable or disable a slot so that said single compatible board is enabled only when the computer is operating in the IBM-At compatible mode and so that said dual compatible board is enabled when the computer is operating in the IBM-AT compatible mode and in the non-IBM-AT compatible mode, said slot control logic further responsive to a master signal to select a direction of propagation of said control signals appropriate to allow said master circuit board to assume control of said bus.

* * * * *

UNITED STATES PATENT AND TRADEMARK OFFICE
CERTIFICATE OF CORRECTION

PATENT NO. : 5,109,517
DATED : Apr. 28, 1992
INVENTOR(S) : Houda, et al.

It is certified that error appears in the above-indentified patent and that said Letters Patent is hereby corrected as shown below:

In Column 11, at line 57, change "operatively" to --compatible--.

In Column 12, at line 13, change "each" to --said--.

Signed and Sealed this

Fifth Day of July, 1994

Attest:

BRUCE LEHMAN

Attesting Officer     Commissioner of Patents and Trademarks